Patented Dec. 17, 1935

2,024,502

UNITED STATES PATENT OFFICE 2,024,502

DYESTUFF PRINTING PASTE

Hermann Berthold, Leverkusen-I. G.-Werk, Germany, assignor to General Aniline Works, Inc., New York, N. Y., a corporation of Delaware No Drawing. Application February 11, 1935, Serial No. 6,099. In Germany February 19, 1934

3 Claims. (Cl. 8—6)

The present invention relates to new dyestuff printing pastes.

My invention is concerned with vat and sulfur dyestuff printing preparations which are characterized by the presence of a mercapto compound selected from the group consisting of mercaptobenzimidazoles and mercaptobenzothiazoles. This invention is based on the discovery that mercapto compounds of the character described are capable of improving the capacity of printing of vat and sulfur dyestuffs. Thus, the presence of the said mercapto compounds in printing pastes effects a considerable improvement as to the strength of the prints and speed of fixation. Another feature of these mercapto compounds lies in the fact that they are capable of stabilizing the printing preparations as well as the unfinished prints; in consequence thereof printing pastes having incorporated therein the new stabilizers, show a much longer lifetime and can be stored without impairing the yield of the dyestuff. The same holds true with regard to the unfinished prints which can be stored before steaming without running the risk of a decrease of yield. In this respect my stabilizers are far superior to every hitherto employed auxiliary agent for the textile printing, for example, hydroxyanthraquinones or hydrotropically acting substances.

Obviously, in the course of the printing and developing processes the mercaptobenzothiazoles and mercaptobenzimidazoles may undergo chemical reactions, thus yielding compounds of a higher stage of oxidation. My experiments have proved, however, that derivatives of the character described, for instance, the corresponding disulfides, have the same stabilizing effect as the mercapto compounds themselves, and are, in consequence thereof, intended to fall within the scope of the term "mercaptobenzimidazoles and mercaptobenzothiazoles" as obvious chemical equivalents thereof, as far as the present case is concerned. Besides the free mercaptobenzothiazoles and mercaptobenzimidazoles there may be employed substitution products thereof, such as alkyl-, alkoxy-, halogen- or nitro-derivatives.

The incorporation of my stabilizers or the derivatives thereof within the dyestuffs may be accomplished in a variety of ways. For example, the constituents may be mixed in the dry state while subsequently grinding the mixture, or in form of aqueous pastes; the stabilizers, furthermore, may be added to the printing colors either to the ready-made preparations or at any stage of their manufacture. Generally, the best results are obtained when adding the stabilizers to aqueous pastes of the dyestuffs containing glycerine or another similar water-soluble polyvalent alcohol, such as glycol, thiodiglycol, thiodiglycerol and the like. It follows therefrom that the employment of my stabilizers is not restricted to any particular class of printing preparations, it being understood that they can be employed in connection with dry preparations as well as with printing pastes either with or without previous reduction.

In the following there are given examples for different types of printing preparations either for the printing with previous reduction or without previous reduction, which are all characterized by the presence of the "stabilizer", it being understood that as stabilizers there can be used any derivative of mercaptobenzothiazole or mercaptobenzimidazole as well as the free compounds themselves. As examples for derivatives there may be mentioned, for instance, mercaptobenzimidazole, mercaptobenzothiazole, alkyl-substitution products thereof, alkoxy-substitution products thereof, halogen-substitution products thereof and nitro-substitution products thereof.

Example 1

800 parts by weight of the dyestuff of Example 1 of U. S. Patent 1,667,848, are mixed with 2000 parts by weight of glycerine, 800 parts by weight of stabilizer, 80 parts by weight of 2.6-dihydroxyanthraquinone and water and finely ground in the ballmill.

The dyestuff preparation thus obtained is a smooth paste, which is stable to frost, does not deposit or form crusts and can be stored for an unlimited time. In case the steaming of the printed goods cannot be performed at once but only after some hours hanging, no considerable decrease in the strength of the color can be observed, i. e. the stabilizing effect of the printing color asserts itself also on the printed goods.

Example 2

A printing color consisting of 72 grams of a thickening of the following constitution:—

| | Per Cent |
|---|---|
| Wheat starch | 6 |
| Water | 15 |
| British gum powder | 6 |
| Industrial gum | 26 |
| Tragacanth 65:1000 | 17 |
| Potash | 15 |
| Sodium formaldehyde sulfoxylate | 15 |
| | 100 |

| | Grams |
|---|---|
| An aqueous dyestuff paste | 20 |
| Glycerine | 4 |
| Stabilizer | 4 |
| | 100 | and which contains as dyestuff one of the following compounds:—5.5'- dichloro-4.7.4'.7'- tetramethyldithionaphthene indigo; the brown dyestuff obtainable by oxidation of naphthoxy-thiophene carboxylic acid as described in Example 1 of U. S. Patent 888,852 or the bluish-green dyestuff obtainable from 10 parts of mononitromethylbenzanthrone and 40 parts of sulfur, the mixture of which is heated at 220–240° C. until the evolution of hydrogen sulfide has ceased, yields better fixing printings of a deeper coloration than those of corresponding printing colors but without the addition of a stabilizer containing instead 8 grams of glycerine.

The prints obtained according to the method of this example show the advantage of an excellent stability even after hanging for some time before steaming.

Example 3

A printing color of one of the following dyestuffs:—dimethoxydibenzanthrone, the dyestuff obtainable according to U. S. Patent 996,109 from 1-amino-4-benzoylaminoanthraquinone and 5-benzoylamino-1-chloroanthraquinone, 6.6'-diethoxy-2.2'-bis-thionaphthene indigo, 6.6'-dichloro-4.4'-dimethyl-bis-thionaphthene indigo, 5.5'-dichloro-4.7.4'.7'- tetramethyl-bis-thionaphthene indigo, perylene tetracarboxylic acid-dipara-anisidide, the brown dyestuff obtainable by oxidizing naphthoxy-thiophene-carboxylic acid according to Example 1 of U. S. Patent 888,852, the bluish-green dyestuff from mononitromethylbenzanthrone and sulfur as described in Example 2, is prepared according to the method described in Example 2 while using 4% of a preparation consisting of: 160 grams of a stabilizer, 500 grams of glycerine, 80 grams of 2.6-dihydroxy-anthraquinone and 100 grams of water and being milled in a ballmill.

The prints obtained therefrom have considerably deeper shades and are of an improved stability compared with prints obtained from printing pastes without the addition of the above mentioned preparation.

Example 4

160 grams of a stabilizer are mixed with 500 grams of glycerine and 80 grams of 2.6-dihydroxy-anthraquinone, and then finely ground. A printing color containing 4% of this preparation and the dyestuff obtained from 1-amino-4-benzoylaminoanthraquinone and 5-benzoylamino-1-chloro-anthraquinone and being otherwise produced as described in the foregoing examples, yields printings of considerably increased depth even after storage of the printed goods for some time before steaming.

I claim:—

1. Vat and sulfur dyestuff printing pastes comprising a mercapto compound from the group consisting of mercaptobenzothiazoles and mercaptobenzimidazoles.

2. Printing pastes as claimed in claim 1, in which the unsubstituted mercaptobenzothiazole is employed.

3. Printing pastes as claimed in claim 1, in which the unsubstituted mercaptobenzimidazole is employed.

HERMANN BERTHOLD.